(No Model.)

E. H. MOORMAN.
STEAM COOKER.

No. 511,351. Patented Dec. 26, 1893.

Witnesses.
N. F. Matthews
C. H. Kaiden

Inventor:
Eli H. Moorman
By James Sheehy
Attorney

UNITED STATES PATENT OFFICE.

ELI H. MOORMAN, OF MINNEAPOLIS, MINNESOTA.

STEAM-COOKER.

SPECIFICATION forming part of Letters Patent No. 511,351, dated December 26, 1893.

Application filed August 24, 1893. Serial No. 483,996. (No model.)

*To all whom it may concern:*

Be it known that I, ELI H. MOORMAN, a citizen of the United States, residing at Minneapolis, in the county of Hennepin and State of Minnesota, have invented certain new and useful Improvements in Steam-Cookers; and I do declare the following to be a full, clear, and exact description of the invention, such as will enable others skilled in the art to which it appertains to make and use the same.

My invention relates to improvements in steam cookers and it has for its general object to provide a steam cooker embodying such a construction that the generation of steam and consequently the cooking will take place immediately after the cooker is placed upon a stove or heater and charged with water.

A further object of the invention is to provide a steam cooker with means whereby the cook may readily place the vessels containing the food in the cooker and as readily raise or remove the same without danger of scalding or burning his hands.

Other objects and advantages will be fully understood from the following description and claims when taken in connection with the annexed drawings, in which—

Figure 1:
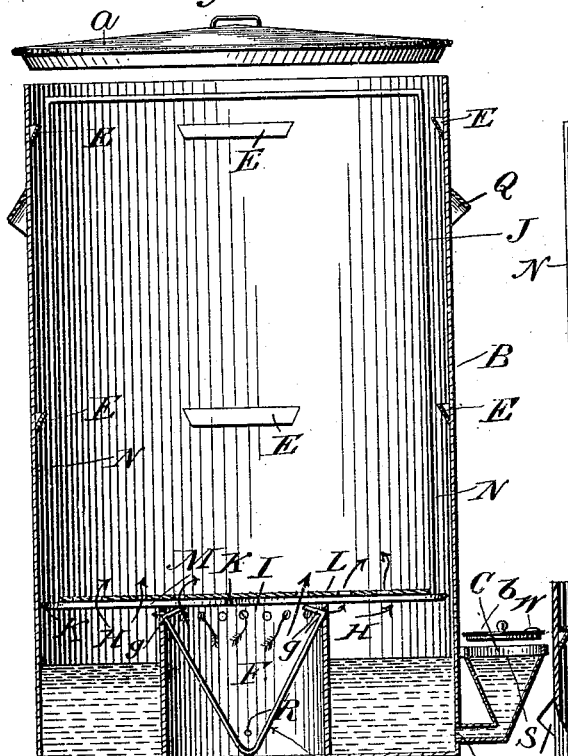
Figure 2:
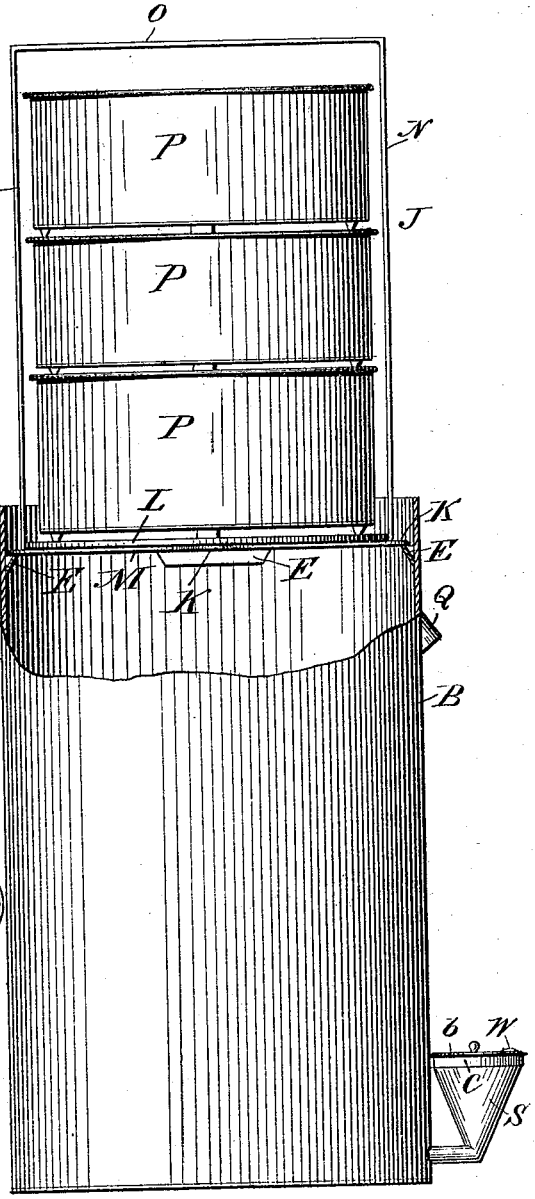
Figure 3:
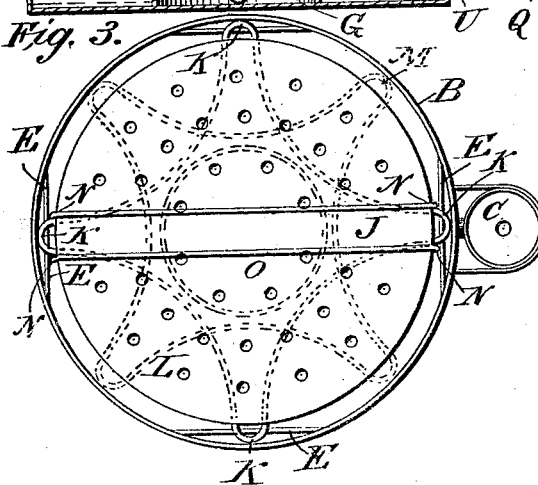

Figure 1, is a vertical, diametrical section, of my improved cooker. Fig. 2, is an elevation, partly in section, of the same; the platform for supporting the food receptacles being illustrated in its raised position, and Fig. 3, is a plan view of the cooker with the cover removed.

Referring by letter to said drawings:—B, indicates the outer casing of the cooker which is preferably of a general cylindrical form and is provided with a removable cover *a*, as shown; and C, indicates the feed spout through which water is let into the casing. This spout C, is connected to the casing by a tube as U, and it is normally covered by a cap or cover *b*, in which is arranged a whistle *w*, which is designed to sound an alarm when the water in the casing is low enough to permit the steam to pass through the tube U.

F, indicates the steam generating chamber of the cooker. This chamber F, is arranged upon the bottom of the casing at the center thereof, and it is provided with a minute aperture R, for the admission of water, and with a series of apertures I, which latter are arranged adjacent to its upper end and are designed to afford an escape for the steam as will be presently described. The aperture R, is preferably arranged adjacent to the bottom of the chamber F, as shown, and it is designed to admit the water slowly into said chamber so as to facilitate the generation of steam as will be more fully hereinafter described.

L, indicates the movable plate or platform upon which the food vessels P, are arranged as shown in Fig. 2. This platform is foraminated as shown for the passage of the steam, and it is provided upon its under side with a wire frame M, which comprises a series of lugs or branches K, which are extended beyond the edge of the platform, as shown. These extended branches or lugs K, are designed to engage the ledges or shelves E, of the casing so as to support the vessels P, at various elevations, and in order to enable the operator to raise the platform L, so as to place the lugs or branches in engagement with the shelves E, at various elevations, I have provided the platform with a bail J, which comprises the legs N, and the bridge or cross-piece O, as shown. By this construction it will be readily perceived that the cook is enabled to conveniently raise and lower the platform L, and turn the same so that its lugs or branches K, will engage the ledges E, as better shown in Fig. 2.

In the practical operation of my invention the cooker is placed upon a stove and the platform L, is raised and turned so that its lugs or branches K, will engage the uppermost set of ledges E. The vessels P, containing the food are then placed upon the platform, and the platform is turned so as to disengage its lugs K, from the ledges E, and the whole is lowered into the casing until the platform rests upon the chamber F. The cover *a*, is then replaced upon the casing and water is poured into the cooker until it reaches about the level indicated by the letter S. As the water rises in the casing it will take slowly through the aperture R, into the chamber F, and falling upon the bottom thereof, which has become hot, it will be immediately converted into steam. Thus it will be seen that the generation of steam and consequently the cooking, commences as soon as water is let into the casing, which is an important advantage.

In order to promote the circulation of steam in the casing and thereby promote the cooking, I prefer to employ vessels P, having lugs or legs upon their bottoms, so that spaces will be formed between the vessels as shown.

By reason of the construction hereinbefore described, it will be seen that not only is the cook enabled to raise and lower the vessels in the casing without scalding or burning his hands, but he is enabled to support the vessels at various elevations and conveniently examine their contents; and if necessary he may adjust the platform L, so that the lower vessels will remain in the casing and be acted upon by the steam while the upper one rests in the open air.

I have specifically described the construction and relative arrangement of the several elements of my improved cooker, in order to impart a full and clear understanding of the same, but I do not desire to be understood as confining myself to such specific construction and arrangement of parts, as I reserve the right to make, in practice, such changes or modifications as fairly fall within the scope of my invention.

In order to slightly bulge the bottom of the steam chamber F, so that the water will flow to the center thereof and be more quickly converted into steam, I have provided the brace or stiffener G. This brace or stiffener is preferably formed from wire and is of a general V-form, and it is provided at its ends with the inwardly turned branches g, so as to form acute angles which are designed to engage diametrically opposite apertures I, and hold the brace or stiffener in position.

Having described my invention, what I claim is—

1. The herein described steam cooker comprising a casing having ledges arranged at various elevations, a generating chamber arranged upon the bottom of the casing at the center thereof, and having an aperture F, in its side wall, and also having a series of apertures I, in its side wall adjacent to its upper edge, and a movable foraminated platform adapted to rest upon the side wall of the steam generating chamber and having radially extended lugs or branches adapted to engage the ledges of the casing and also having a fixedly connected bail, all substantially as and for the purpose set forth.

2. In a steam cooker, the combination with a casing having ledges arranged at various elevations; of a vertically-movable platform arranged in the casing, a wire frame connected to the platform and having branches or lugs extended beyond the edges thereof, and a bail connected to the platform, substantially as specified.

3. In a steam cooker, the combination with a casing and the generating chamber arranged upon the bottom of the casing and having apertures I, in its side walls; of a brace or stiffener of a general V-form, arranged in the generating chamber and adapted to engage the apertures I, of said chamber and the bottom of the casing, substantially as and for the purpose set forth.

In testimony whereof I affix my signature in presence of two witnesses.

ELI H. MOORMAN.

Witnesses:
C. A. ROBBINS,
W. S. COOPER.